Jan. 3, 1961 F. C. ALDRED ET AL 2,966,865
DISPOSAL OF EFFLUENT
Filed July 30, 1957
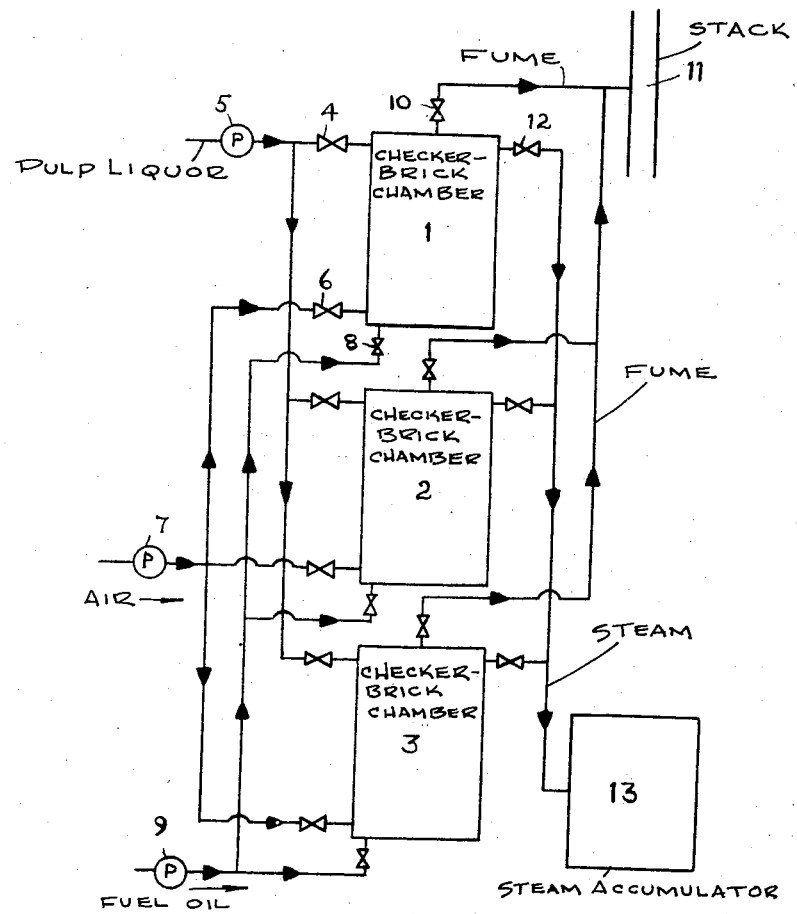
Inventors
Fred Crowther Aldred
William Gerard Daroux
By their attorneys
Howson and Howson 2,966,865
Patented Jan. 3, 1961

2,966,865
DISPOSAL OF EFFLUENT

Fred Crowther Aldred and William Gerard Daroux, Coventry, England, assignors to Courtaulds Limited, London, England, a British company Filed July 30, 1957, Ser. No. 675,137

Claims priority, application Great Britain Aug. 9, 1956

2 Claims. (Cl. 110—7)

This invention relates to the disposal of effluent and in particular, of pulp mill effluent.

In the manufacture of wood pulp for the rayon and paper industries, wood chips are usually digested by boiling with a cooking liquor, for example calcium bisulphite liquor, for several hours and the fibrous residue is then strained off leaving a waste pulp liquor having in solution degraded cellulose and other organic materials.

In the past, the disposal of the waste pulp liquor has presented a major problem to the pulp industry because of its organic content. The liquor cannot be discharged in large volumes into streams or rivers, otherwise serious pollution would occur.

It has been proposed to oxidise the pulp liquor under high pressure and at elevated temperatures in a pressure reactor, when the exothermic reaction which takes place results in the production of steam which can be flashed off through a turbine so as to provide power for factory uses. The residual liquor remaining in the pressure reactor is innocuous as an effluent and may be disposed of without difficulty.

The capital cost of the necessary equipment is high and when air is used as the oxidising medium considerable power is wasted in compressing nitrogen and other non-oxidising components in air to the high pressure required for injection into the pressure reactor.

The object of the present invention is to provide an improved process for treating pulp mill effluent.

According to the present invention, a process for the treatment of an aqueous liquid containing non-volatile oxidisable components comprises repeated cycles of passing a predetermined volume of the liquor into a chamber heated to a sufficiently high temperature and having sufficient thermal capacity to evaporate the liquid content of the liquor and so leave a solid residue within the chamber, and then passing air through the chamber whilst the chamber is still at a sufficiently high temperature to oxidise the oxidisable components of the residue so that the heat produced by exothermic reaction reheats the chamber in preparation for the next charge of liquor.

Preferably the chamber consists of a steel shell, suitable for a working pressure of about 200 pounds per square inch gauge and filled with a suitably spaced material of high thermal capacity, for example checker brick, to increase the effective surface area inside the chamber.

The steam evolved from the chamber at a pressure of about 200 pounds per square inch gauge in the first stage of the process may be used as a source of power for operating the air compressors and pumps associated with the apparatus and for other uses in the mill such as driving turboalternators or heating.

If the liquor is rich in oxidisable material it may, if required, be diluted with water. If, however, the liquid has a low content of oxidisable material then further material in the form of solid carbonaceous wastes may be added in order to render the process efficient.

Incombustible ash gradually builds up in the chamber and at intervals this ash has to be cleared out. The ash may be discarded or treated for the extraction of useful salts.

The apparatus may conveniently include three chambers two of which are operated according to the invention in tandem, that is, whilst the liquor is being evaporated in one chamber, the residue of an earlier evaporation in the other chamber is being burnt, and the ash is being cleared out of the third.

The accompanying drawing illustrates one specific apparatus suitable for treating waste pulp liquor in accordance with the invention. The drawing shows three chambers 1, 2 and 3, twenty feet long and ten feet in diameter set up alongside each other. The chambers are constructed of a mild steel shell capable of withstanding a working pressure of 200 pounds per square inch gauge and are lined with refractory brick. The interior of each chamber is filled with checker brick, so that approximately 50 percent of the air space of the chamber is occupied by the bricks, to increase the thermal capacity and the surface area available for the deposit of the solid residue after evaporation.

Three inlet pipes fitted with valves are provided for each chamber, the pipes and valves for each chamber being the same. As shown particularly for chamber 1, the chamber is provided with a pulp liquor inlet 4 for spraying in the pulp liquor, pumped by a feed pump 5, into the top of the chamber, an air inlet 6, fed by an air blower 7, for admitting air into the base of the chamber and an oil inlet 8 for the injection of fuel oil, pumped by a pump 9, into the base of the chamber. A fume outlet 10 leading to a stack pipe 11 is provided for leading gases out of the top of the chamber and a steam outlet 12 is provided for leading steam from the top of the chamber to a steam accumulator 13. Each outlet is fitted with a valve.

In operation two chambers are operated in tandem whilst the remaining chamber is closed down for the removal of ash. On starting up the process, one chamber, say chamber 1, is brought to a dull red heat at about 800° C. to 1100° C. by means of a fuel oil burner fed from the oil inlet 8 whilst the liquor inlet 4 and the steam outlet 12 are kept closed. The oil and air inlets 8 and 4 and the steam outlet 12 are then closed, a predetermined amount of pulp liquor, normally of about 5 tons, is sprayed into the chamber through the liquor inlet valve 4 and the steam outlet 12 is opened.

Owing to the heat held by the checker brick the liquid content of the liquor is flashed off through the steam outlet 12 to the steam accumulator 13 at a pressure of about 200 pounds per square inch where, after suitable treatment, it is available as a source of power or heat. The solid residue left after evaporation is deposited upon the checker brick.

The liquor inlet 4 and steam outlet 12 are now closed and the air inlet 6 and fume outlet 10 are opened. Air is forced at low pressure into the chamber causing the oxidisable component of the residue to burn; to accomplish this the temperature in the chamber immediately prior to the admission of air should not be below 200° C. The heat given out in this exothermic reaction brings the checker brick again to a dull red heat in preparation for another charge of liquor. The fumes during this operation pass out through the fume outlet 10 to the stack 11 and useful heat may be extracted from these escaping gases by means of a heat exchanger. This operation concludes the cycle and the cycle is repeated with the heated chamber.

The second chamber is operated in like manner but one step out of phase with the first chamber so that whilst one chamber is evaporating the liquor and producing steam, combustion of residue is taking place in the other chamber. By this means the production of steam is kept as continuous as possible.

At intervals a chamber is closed down for cleaning and the inoperative chamber, now clean, is brought into operation.

Although the process has been described in respect of the treatment of pulp mill liquor it will operate in a similar manner with any liquid containing oxidisable matter in sufficient quantity to provide, on combustion, sufficient heat to evaporate the same volume of liquor as that volume originally containing the oxidisable matter.

What we claim is:

1. A continuous cyclic process for the treatment of an aqueous liquor containing non-volatile oxidisable components which comprises passing a quantity of said liquor into a first hot chamber having a high thermal capacity, said first chamber being at a temperature of at least 800° C., evaporating the liquid content of said liquor, drawing off the resulting vapor and leaving said non-volatile components within said chamber, terminating the flow of liquor to said first chamber while it is still at a temperature of at least 200° C., and causing said liquor to flow into a second chamber having a high thermal capacity, said second chamber being at a temperature of at least 800° C., evaporating the liquid content of said liquor in said second chamber, drawing off the resulting vapor and leaving said non-volatile components in said second chamber, passing air into said first chamber, and oxidising and burning said non-volatile oxidisable components in said first chamber thereby reheating said first chamber, terminating the flow of liquor to said second chamber while it is still at a temperature of at least 200° C., passing air into said second chamber and oxidising and burning the non-volatile components deposited in said second chamber, thereby reheating said second chamber, and again passing said liquor into said first chamber at a time subsequent to the time when the flow of liquor into said second chamber has been terminated.

2. The process claimed in claim 1 wherein the temperature of the hot chambers into which the liquor is passed is between about 800° C. and about 1100° C.

References Cited in the file of this patent

UNITED STATES PATENTS

| | | |
|---|---|---|
| 810,486 | Harrison | Jan. 23, 1906 |
| 1,137,780 | Moore | May 4, 1915 |
| 1,459,084 | Bezanson | June 19, 1923 |
| 1,733,292 | Breisig | Oct. 29, 1929 |
| 2,678,615 | Soderlund et al. | May 18, 1954 |
| 2,747,552 | Kyrklund | May 29, 1956 |